United States Patent
Marupaduga et al.

(10) Patent No.: US 10,555,211 B1
(45) Date of Patent: Feb. 4, 2020

(54) INTERMODULATION INTERFERENCE MITIGATION IN A WIRELESS ACCESS POINT THAT USES MULTI-BAND CARRIER AGGREGATION

(71) Applicant: Sprint Communications Company L.P., Overland Park, KS (US)

(72) Inventors: Sreekar Marupaduga, Overland Park, KS (US); Rajveen Narendran, Olathe, KS (US)

(73) Assignee: Sprint Communications Company L.P., Overland Park, KS (US)

(*) Notice: Subject to any disclaimer, the term of this patent is extended or adjusted under 35 U.S.C. 154(b) by 0 days.

(21) Appl. No.: 16/400,284

(22) Filed: May 1, 2019

(51) Int. Cl.
*H04W 24/00* (2009.01)
*H04W 28/04* (2009.01)
*H04W 76/27* (2018.01)
*H04W 24/10* (2009.01)

(52) U.S. Cl.
CPC ........... *H04W 28/04* (2013.01); *H04W 24/10* (2013.01); *H04W 76/27* (2018.02)

(58) Field of Classification Search
CPC ..... H04W 28/04; H04W 76/27; H04W 24/10; H04W 28/20; H04W 76/28; H04W 8/24; H04W 80/02; H04W 80/10; H04L 5/00; H04L 5/0082
USPC ................................ 455/423; 370/230.1, 329
See application file for complete search history.

(56) References Cited

U.S. PATENT DOCUMENTS

| | | | |
|---|---|---|---|
| 9,094,917 B2 | 7/2015 | Charbit et al. | |
| 9,258,809 B2 | 2/2016 | Liao et al. | |
| 9,350,477 B1 | 5/2016 | Jung et al. | |
| 9,402,264 B2 | 7/2016 | Zhu et al. | |
| 9,973,967 B2 | 5/2018 | Ratasuk et al. | |
| 2008/0188195 A1* | 8/2008 | Shi | H03F 1/32 455/232.1 |
| 2012/0069766 A1* | 3/2012 | Fu | H04B 1/406 370/252 |
| 2013/0250871 A1* | 9/2013 | Kaukovuori | H04W 72/082 370/329 |
| 2015/0103758 A1* | 4/2015 | Wang | H04W 72/0426 370/329 |
| 2015/0126207 A1* | 5/2015 | Li | H04W 16/14 455/452.1 |

(Continued)

FOREIGN PATENT DOCUMENTS

WO   WO-2014047860 A1 * 4/2014

*Primary Examiner* — Mahendra R Patel

(57) ABSTRACT

A wireless access point wirelessly serves User Equipment (UEs) with a wireless communication service using carrier aggregation and intermodulation interference mitigation. The wireless access point transfers user data to the UEs using carrier aggregation over a primary Long Term Evolution (LTE) band that transports LTE primary component carriers, secondary LTE bands that transport LTE secondary component carriers, and secondary Fifth Generation New Radio (5GNR) bands that transport 5GNR secondary component carriers. The wireless access point measures intermodulation interference in the secondary 5GNR bands. The wireless access point terminates at least some of the LTE secondary component carriers in the secondary LTE bands when the intermodulation interference in the secondary 5GNR bands exceeds an interference threshold.

18 Claims, 6 Drawing Sheets

(56) References Cited

U.S. PATENT DOCUMENTS

| | | | |
|---|---|---|---|
| 2015/0334575 A1* | 11/2015 | Joshi | H04W 72/0453 |
| | | | 370/329 |
| 2016/0338071 A1* | 11/2016 | Khosla | H04W 72/1215 |
| 2017/0094628 A1* | 3/2017 | Miao | H04W 60/00 |
| 2018/0054835 A1* | 2/2018 | Fodor | H04W 72/1205 |
| 2018/0083688 A1 | 3/2018 | Agiwal et al. | |
| 2018/0199328 A1* | 7/2018 | Sang | H04B 7/0617 |
| 2018/0324785 A1* | 11/2018 | Nammi | H04W 4/027 |
| 2019/0044689 A1* | 2/2019 | Yiu | H04L 5/0098 |
| 2019/0075438 A1* | 3/2019 | Kuo | H04W 76/15 |
| 2019/0075596 A1* | 3/2019 | Ye | H04L 5/0053 |

* cited by examiner

INTERMODULATION INTERFERENCE MITIGATION IN A WIRELESS ACCESS POINT THAT USES MULTI-BAND CARRIER AGGREGATION

TECHNICAL BACKGROUND

Wireless user devices exchange wireless signals with wireless communication networks for data services like voice-calling and internet-access. The wireless communication networks have wireless access points that exchange the wireless signals with the wireless user devices. Popular forms of wireless networking comprise Long Term Evolution (LTE) and Fifth Generation New Radio (5GNR). LTE and 5GNR use Carrier Aggregation (CA) technology to dramatically increase the bandwidth and corresponding data speed for the wireless user devices.

Typically, a wireless access point serves a wireless user device over a single uplink and a single downlink. With CA, the wireless access point still serves the wireless user device over the single uplink but now serves the wireless user device over multiple downlinks. The uplink and one downlink comprise a CA primary component carrier. The remaining downlinks comprise CA secondary component carriers. With multi-band CA, the secondary component carriers may use different frequency bands from each other and from the primary component carrier. With LTE/5GNR dual connectivity, the primary component carrier uses LTE and the secondary component carriers may use LTE and/or 5GNR over the various secondary component carriers.

Modulation entails the physical mixing of signals on a common medium. For example, a one gigahertz carrier signal may be mixed with a ten kilohertz data signal. The modulation results include Nyquist components at various frequencies. Nyquist components are produced at the sum of the frequencies, the difference of between the frequencies, and their multiples. When the data frequency is much smaller than the carrier frequency, the Nyquist components are effectively multiples of the carrier frequency.

The wireless access points comprise antennas, circuitry, and data links that may generate Nyquist products due to rust, damage, or some other defect. The defect acts like a mixer and generates unwanted wireless signals at multiples of the carrier frequency. These unwanted wireless signals are referred to as intermodulation interference. Thus, antenna rust may generate intermodulation interference from the carrier frequency that destroys wireless signals at multiples of the carrier frequency.

With multi-band CA, the intermodulation interference generated from a component carrier can destroy the wireless signal quality of another component carrier. For example, the third order intermodulation interference generated from a one gigahertz component carrier can destroy the signal quality of a three gigahertz component carrier. Unfortunately, 5GNR/LTE access points do not efficiently and effectively mitigate intermodulation interference when using multi-band CA.

Technical Overview

A wireless access point wirelessly serves User Equipment (UEs) with a wireless communication service using carrier aggregation and intermodulation interference mitigation. The wireless access point transfers user data to the UEs using carrier aggregation over a primary Long Term Evolution (LTE) band that transports LTE primary component carriers, secondary LTE bands that transport LTE secondary component carriers, and secondary Fifth Generation New Radio (5GNR) bands that transport 5GNR secondary component carriers. The wireless access point measures intermodulation interference in the secondary 5GNR bands. The wireless access point terminates at least some of the LTE secondary component carriers in the secondary LTE bands when the intermodulation interference in the secondary 5GNR bands exceeds an interference threshold.

DETAILED DESCRIPTION

Figure 1:
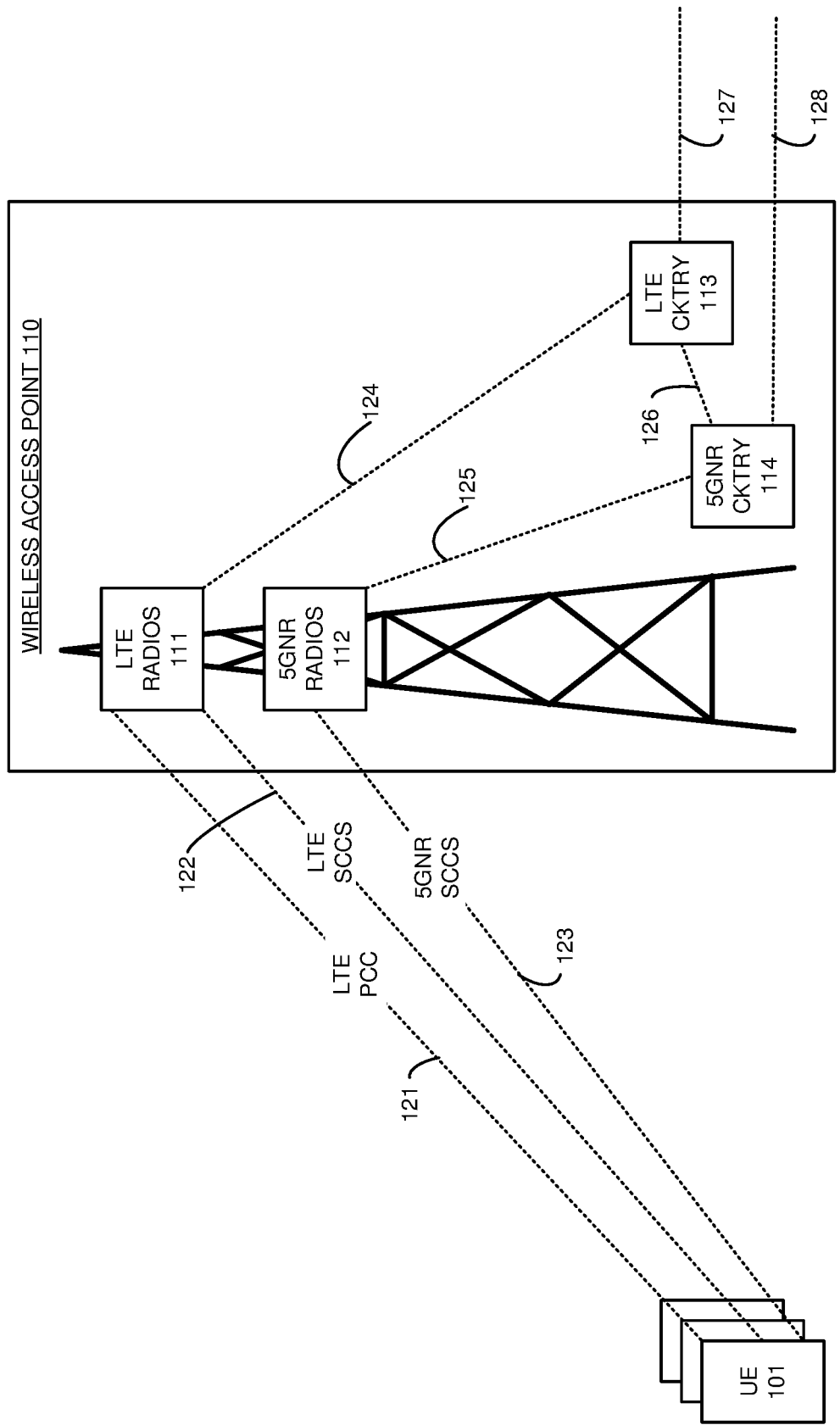
FIG. 1 illustrates a wireless access point that wirelessly serves User Equipment (UEs) with a wireless communication service using carrier aggregation and intermodulation interference mitigation.

FIG. 1 illustrates wireless access point 110 that wirelessly serves User Equipment (UE) 101 with a wireless communication service using Carrier Aggregation (CA) and intermodulation interference mitigation. Wireless access point 110 comprises Long Term Evolution (LTE) radios 111, Fifth Generation New Radio (5GNR) radios 112, LTE processing circuitry (CKTRY) 113, and 5GNR processing circuitry 114. UE 101 and LTE radios 111 communicate over primary LTE frequency band 121 and secondary LTE frequency bands 122. UE 101 and 5GNR radios 112 communicate over secondary 5GNR frequency bands 123.

To use CA, wireless access point 110 serves the wireless communication service to UE 101 over an LTE Primary Component Carrier (PCC) in primary LTE frequency band 121. Wireless access point 110 also serves the wireless communication service to UE 101 over LTE Secondary Component Carriers (SCCs) in secondary LTE frequency bands 122 and 5GNR SCCs in secondary 5GNR frequency bands 123. The number of UEs depicted on FIG. 1 has been restricted for clarity, and wireless access point 110 serves many more UEs that are like UE 101 over additional PCCs and SCCs in frequency bands 121-123. Exemplary frequency bands 121-123 are typically in the 0.5 gigahertz to 8 gigahertz range and are typically hundreds of megahertz wide.

LTE radios 111 and LTE processing circuitry 113 communicate over LTE data link 124. 5GNR radios 112 and 5GNR processing circuitry 114 communicate over 5GNR data link 125. LTE processing circuitry 113 and 5GNR processing circuitry 114 communicate over X2 data link 126. LTE processing circuitry 113 communicates with a network core (not shown) over S1 data links 127. In some examples, 5GNR processing circuitry 114 communicates with the network core over N3 data links 128.

UE 101 might be a phone, computer, robot, vehicle, sensor, and/or the like. UE 101 comprises radio circuitry and user circuitry. The radio circuitry comprises antennas, modulators, amplifiers, filters, digital/analog interfaces, processing circuitry, memory circuitry, and bus circuitry. The user circuitry comprises processing circuitry, memory circuitry, bus circuitry, user interfaces, and the like. The memory circuitry stores software that includes operating systems, network applications, and user applications. The network applications comprise Physical Layer (PHY), Media Access Control (MAC), Radio Link Control (RLC), Packet Data Convergence Protocol (PDCP), Radio Resource Control (RRC), and Service Data Application Protocol (SDAP), or some other networking protocol stack. The processing circuitry executes the operating systems, network applications, and user applications to wirelessly exchange user data and network signaling with wireless access point 110.

In wireless access point 110, radios 111-112 comprise antennas, modulators, amplifiers, filters, digital/analog interfaces, processors, memory, transceivers, and bus circuitry. The processors comprise Digital Signal Processors (DSPs), Central Processing Units (CPUs), Graphical Processing Units (GPUs), Field Programmable Gate Arrays (FPGAs), Application Specific Integrated Circuits (ASICs) and/or the like. The memory comprises Random Access Memory (RAM), flash memory, disk drives, and/or the like. The memory stores software like operating systems and network applications. The network applications may comprise PHY, MAC, RLC, PDCP, RRC, and SDAP or some other network protocol stack. The processors execute the operating systems and network applications to wirelessly exchange user data and network signaling with UE 101 and to exchange user data and network signaling with processing circuitry 113-114.

In wireless access point 110, processing circuitry 113-114 comprises processors, memory, transceivers, and bus circuitry. The processors comprise DSPs, CPUs, GPUs, FPGAs, ASICs and/or the like. The memory comprises RAM, flash memory, disk drives, and/or the like. The memory stores software like operating systems and network applications. The network applications may comprise PHY, MAC, RLC, PDCP, RRC, and SDAP or some other network protocol stack. The processors execute the operating systems and network applications to wirelessly exchange user data and network signaling with radios 111-112 over data links 121-123 and to exchange user data and network signaling with the network core over data links 127-128.

Initially, UE 101 wirelessly attaches to LTE radios 111 over primary LTE band 121. LTE processing circuitry 113 exchanges network signaling with UE 101 and with the network core to authenticate and authorize UE 101 for a wireless communication service like media conferencing, video downloading, machine control, and the like. LTE processing circuitry 113 exchanges user data and network signaling for the wireless communication service with the network core over LTE link 127. LTE processing circuitry 113 exchanges user data and network signaling for the wireless communication service with LTE radios 111 and 5GNR processing circuitry 114. In some examples, 5GNR processing circuitry 114 also exchanges user data and network signaling for the wireless communication service with the network core over link 128. 5GNR processing circuitry 114 exchanges user data and network signaling for the wireless communication service with 5GNR radios 112 over link 126.

Radios 111-112 exchange user data and network signaling with UE 101 using CA over links 121-123. In particular, LTE radios 111 exchange user data and network signaling with UE 101 over an LTE Primary Component Carrier (PCC) in primary LTE band 121. LTE radios 111 transfer user data to UE 101 over one or more LTE Secondary Component Carriers (SCCs) in secondary LTE frequency bands 122. 5GNR radios 112 transfer user data and network signaling to UE 101 over one or more 5GNR SCCs in secondary 5GNR frequency bands 123. Secondary 5GNR frequency bands 123 are often higher than LTE frequency bands 122, and some 5GNR bands 123 are Nyquist multiples of some LTE bands 122. Thus, LTE bands 122 may cause intermodulation interference in Nyquist-multiple 5GNR bands 123.

In some examples, 5GNR radios 112 measure second order intermodulation interference in secondary 5GNR frequency bands 123. 5GNR radios 112 or 5GNR processing circuitry 114 compare the second order intermodulation interference to a second order interference threshold. For example, 5GNR bands 123 may comprise bands A, B, and C—and band A may have an interference level that exceeds a decibel threshold. When the second order intermodulation interference in secondary 5GNR bands 123 exceeds the second order interference threshold, LTE processing circuitry 113 terminates some of the LTE SCCs in secondary LTE bands 122 that are likely contributing to the second order intermodulation interference. For example, LTE SCCs in secondary LTE bands 122 that are ½ the frequency of 5GNR band A may be terminated.

In some examples, 5GNR radios 112 measure third order intermodulation interference in secondary 5GNR frequency bands 123. 5GNR radios 112 or 5GNR processing circuitry 114 compare the third order intermodulation interference to a third order interference threshold. For example, 5GNR bands 123 may comprise bands A, B, and C—and band B may have an interference level that exceeds a decibel threshold. When the third order intermodulation interference in secondary 5GNR bands 123 exceeds the third order interference threshold, then LTE processing circuitry 113 terminates some of the LTE SCCs in secondary LTE bands 122 that are likely contributing to the third order intermodulation interference. For example, LTE SCCs in secondary LTE bands 122 that are ⅓ the frequency of 5GNR band B may be terminated.

In some examples, 5GNR radios 112 measure fourth order intermodulation interference in secondary 5GNR frequency bands 123. 5GNR radios 112 or 5GNR processing circuitry 114 compare the fourth order intermodulation interference to a fourth order interference threshold. For example, 5GNR bands 123 may comprise bands A, B, and C—and band C may have an interference level that exceeds a decibel threshold. When the fourth order intermodulation interference in secondary 5GNR bands 123 exceeds the fourth order interference threshold, LTE processing circuitry 113 terminates some of the LTE SCCs in secondary LTE bands 122 that are likely contributing to the fourth order intermodulation interference. For example, LTE SCCs in secondary LTE bands 122 that are ¼ the frequency of 5GNR band C may be terminated.

In some examples, 5GNR radios 112 detect data transmission errors in the secondary 5GNR bands 123 and compare the amount of errors to an error threshold. For example, 5GNR radios 112 may detect and compare the average Hybrid Automatic Repeat Request (HARQ) error rate to a HARQ error threshold. In response to excessive data transmission errors in secondary 5GNR bands 123, 5GNR radios 112 or circuitry 114 compare the intermodulation interference in secondary 5GNR bands 123 to the interference thresholds. LTE processing circuitry 113 terminates LTE SCCs in secondary LTE bands 122 when the intermodulation interference is excessive.

Advantageously, wireless access point 110 efficiently and effectively mitigates intermodulation interference when using multi-band 5GNR/LTE CA.

Figure 2:
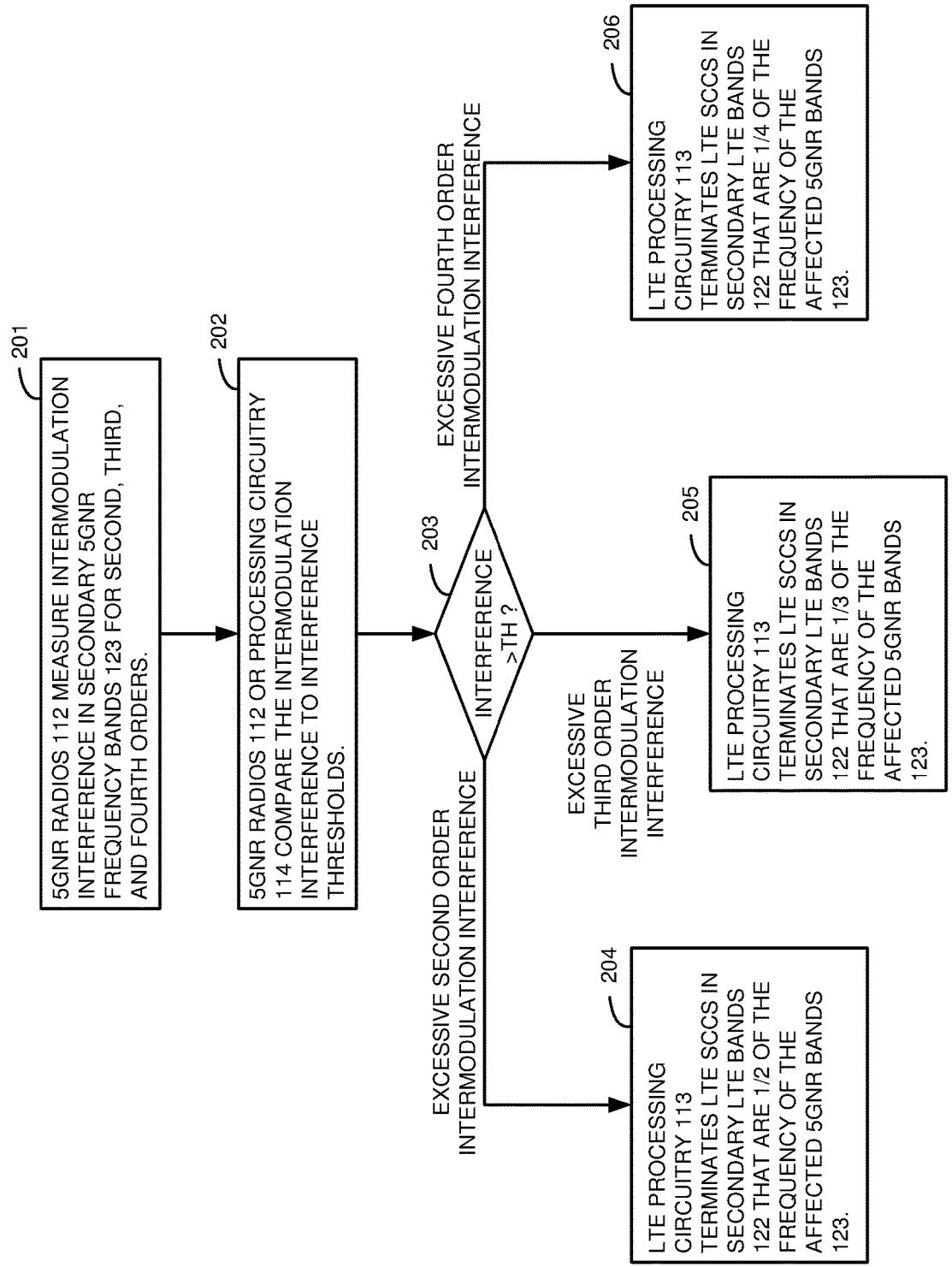
FIG. 2 illustrates the operation of the wireless access point to wirelessly serve the UEs with the wireless communication service using carrier aggregation and intermodulation interference mitigation.

FIG. 2 illustrates the operation of wireless access point 110 to wirelessly serve UEs 101-103 with the wireless communication service using CA and intermodulation interference mitigation. 5GNR radios 112 measure intermodulation interference in secondary 5GNR frequency bands 123 for the second, third, and fourth orders (201). 5GNR radios 112 or 5GNR processing circuitry 114 compare the intermodulation interference to interference thresholds (202). For example, 5GNR bands 123 may have a frequency band with a Signal-to-Interference and Noise Ratio (SINR) that is below the desired quality level. When the second order intermodulation interference in secondary 5GNR bands 123 exceeds the second order interference threshold (203), LTE processing circuitry 113 terminates LTE SCCs in secondary LTE bands 122 that are ½ of the frequency of the affected 5GNR bands 123 (204). When the third order intermodulation interference in secondary 5GNR bands 123 exceeds the third order interference threshold (203), LTE processing circuitry 113 terminates LTE SCCs in secondary LTE bands 122 that are ⅓ of the frequency of the affected 5GNR bands 123 (205). When the fourth order intermodulation interference in secondary 5GNR bands 123 exceeds the fourth order interference threshold (203), LTE processing circuitry 113 terminates LTE SCCs in secondary LTE bands 122 that are ¼ of the frequency of the affected 5GNR bands 123 (206).

Figure 3:
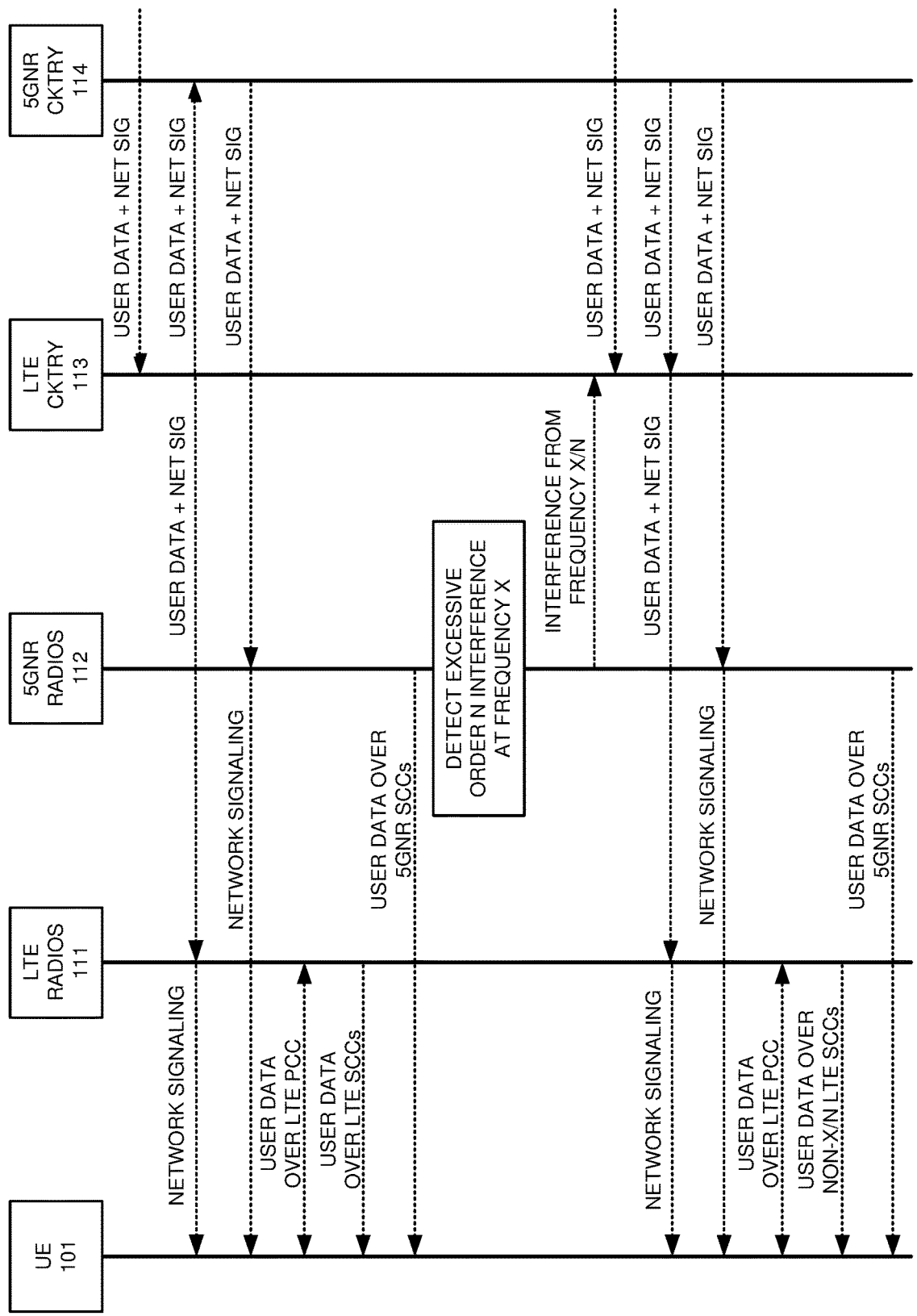
FIG. 3 illustrates the operation of the wireless access point to wirelessly serve the UEs with the wireless communication service using carrier aggregation and intermodulation interference mitigation.

FIG. 3 illustrates the operation of wireless access point 110 to wirelessly serve UEs 101-103 with the wireless communication service using CA and intermodulation interference mitigation. LTE processing circuitry 113 receives user data and network signaling (NET SIG) for the wireless communication service from the network core (not shown). LTE processing circuitry 113 transfers user data and network signaling for the wireless communication service to LTE radios 111 and to 5GNR processing circuitry 114. 5GNR processing circuitry 114 transfers user data and network signaling for the wireless communication service to 5GNR radios 112. Radios 111-112 transfer network signaling to UE 101 to implement CA. LTE radios 111 exchange user data and network signaling with UE 101 over an LTE PCC. LTE radios 111 transfer user data to UE 101 over one or more LTE SCCs. 5GNR radios 112 transfer user data to UE 101 over one or more 5GNR SCCs.

5GNR radios 112 measure intermodulation interference in secondary 5GNR frequency bands 123 having the 5GNR SCCs. 5GNR radios 112 compare the intermodulation interference to an interference threshold to detect excessive interference. 5GNR radios 112 determine the likely order (N) of the intermodulation interference by dividing the affected 5GNR frequency band (X) by order (N) to identify secondary LTE bands (X/N) that likely contribute intermodulation interference. 5GNR radios 112 indicate the possible sources of the intermodulation interference (X/N) to LTE processing circuitry 113. LTE processing circuitry 113 terminates the SCCs in secondary LTE bands 122 (X/N) that are the likely sources of the intermodulation interference. In alternative examples, LTE processing circuitry 113 compares the intermodulation interference to the interference threshold to detect the excessive interference.

Subsequently, LTE processing circuitry 113 receives additional user data and network signaling for the wireless communication service from the network core. LTE processing circuitry 113 transfers user data and network signaling for the wireless communication service to LTE radios 111 and to 5GNR processing circuitry 114. 5GNR processing circuitry 114 transfers user data and network signaling for the wireless communication service to 5GNR radios 112. Radios 111-112 transfer network signaling to UE 101 to implement CA. LTE radios 111 exchange user data and network signaling with UE 101 over the LTE PCC. LTE radios 111 transfer user data to UE 101 over the non-X/N LTE SCCs that were not terminated. 5GNR radios 112 transfer user data to UE 101 over one or more 5GNR SCCs.

Figure 4:
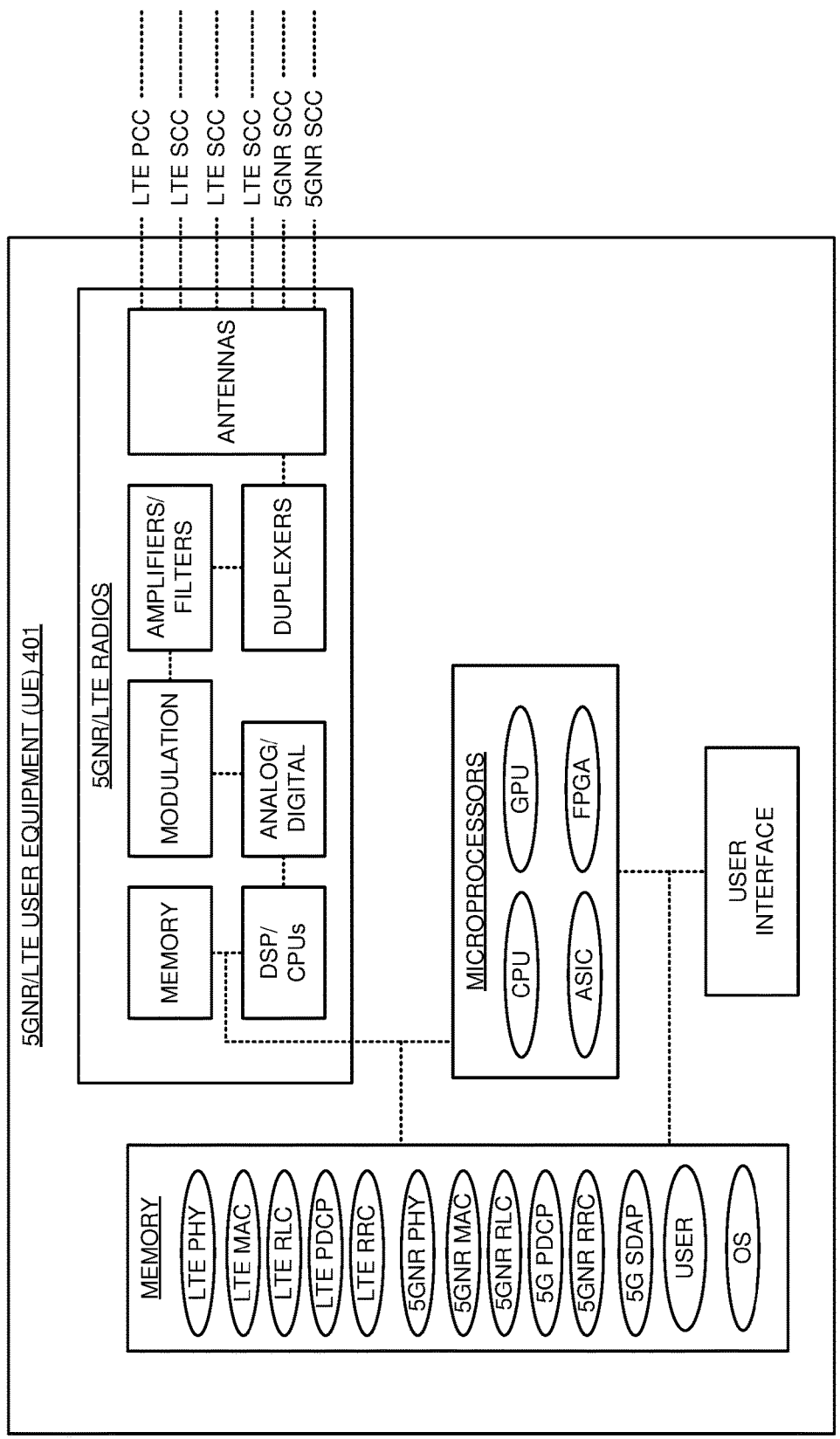
FIG. 4 illustrates a Long Term Evolution (LTE)/Fifth Generation New Radio (5GNR) UE that is wirelessly served by an LTE/5GNR access point using carrier aggregation and intermodulation interference mitigation.

FIG. 4 illustrates Fifth Generation New Radio (5GNR)/Long Term Evolution (LTE) UE 401 that is served by 5GNR/LTE access points that use CA and intermodulation interference mitigation. 5GNR/LTE UE 401 is an example of UE 101 although UE 101 may differ. 5GNR/LTE UE 401 comprises microprocessors, memory, user interface, and radios that are coupled over bus circuitry and/or some other data link. The user interface may comprise transceivers, machine controllers, graphic displays, sensors, cameras, and/or some other user components. The memory comprises volatile and non-volatile memories like RAM, flash, disc, tape, and the like. The memory stores an operating system (OS), network applications, and user application. The network applications comprise LTE PHY, LTE MAC, LTE RLC, LTE PDCP, LTE RRC, 5GNR PHY, 5GNR MAC, 5GNR RLC, 5GNR PDCP, 5GNR RRC, and 5GNR SDAP. The microprocessors comprises CPUs, GPUs, ASICs, FPGAs, and/or some other computer circuitry. The microprocessors execute the operating system and user application to generate user data and signaling. The microprocessors execute the operating system and the network applications to drive the radios to wirelessly exchange user data and network signaling with 5GNR/LTE access points. The radios comprises antennas, duplexers, amplifiers, filters, modulation, analog/digital interfaces, DSPs and/or CPUs, memory, and a transceiver. The antennas exchange user data and network signaling with 5GNR/LTE access points using CA over an LTE PCC and LTE/5GNR SCCs. In the radios, the DSP/CPUs execute software to drive the exchange of user data and network signaling between the antennas and the memories.

The microprocessors execute the operating system and user application to generate and store Uplink (UL) user data and signaling in the main UE memory. The microprocessors execute the operating system and network applications to generate and store UL user data and network signaling in the memory of the 5GNR/LTE radios. In the 5GNR/LTE radios, the DSP/CPUs transfer corresponding UL signals to the analog/digital interface. The analog/digital interface converts the digital UL signals into analog UL signals for modulation. Modulation up-converts the UL signals to the LTE primary frequency band for the LTE PCC. The amplifiers boost the UL signals for the filters which attenuate unwanted out-of-band energy. The filters transfer the UL signals through the duplexers to the antennas. The electrical UL signals drive the antennas to emit corresponding wireless UL signals that transport the UL user data and network signaling to 5GNR/LTE access points.

In the radios, the antennas receive wireless Downlink (DL) signals that transport user data and network signaling from 5GNR/LTE access points. The antennas transfer corresponding electrical DL signals through the duplexers to the amplifiers. The amplifiers boost the received DL signals for filters which attenuate unwanted energy. In modulation, demodulators down-convert the DL signals from the primary LTE frequency band, LTE secondary frequency bands, and 5GNR secondary frequency bands. The analog/digital interfaces convert the analog DL signals into digital DL signals for the DSP/CPUs. The DSP/CPUs recover DL data from the DL signals that includes the user data and network signaling. The DSP/CPUs transfer the DL user data and network signaling to the memories. The microprocessors execute the network applications to process the DL user data and network signaling and forward corresponding user data and signaling to the user application through the operating system.

Through the operating system, the user applications exchange user data and signaling with the LTE RRC. The LTE RRC maps between the user data/network signaling and Service Data Units (SDUs). The LTE RRC exchanges data SDUs with the 5GNR SDAP and the LTE PDCP. The LTE RRC exchanges signaling SDUs with the 5GNR RRC and the LTE PDCP. The 5GNR PDCP and the LTE PDCP map between the SDUs and Protocol Data Units (PDUs). The PDCPs exchange the PDUs with the 5GNR RLC and the LTE RLC. The RLCs map between the PDUs and MAC logical channels. The RLCs exchange user data and network signaling with the 5GNR MAC and the LTE MAC over the MAC logical channels. The MACs map between the MAC logical channels and MAC transport channels. The MACs exchange user data and network signaling with the PHYs over the MAC transport channels. The 5GNR PHY and the LTE PHY map between the MAC transport channels and PHY transport channels. The PHYs exchange user data and network signaling with PHYs in 5GNR/LTE access points over the PHY transport channels.

RRC functions comprise authentication, security, handovers, status reporting, Quality-of-Service (QoS), system broadcasts, and network pages. SDAP functions comprise QoS marking and flow control. PDCP functions comprise security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power headroom, channel quality, Hybrid Automatic Repeat Request (HARQ), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/dematching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

In particular, the LTE RRC exchanges network signaling with 5GNR/LTE access points to establish the LTE PCC and LTE SCCs. The 5GNR RRC exchanges network signaling with the 5GNR/LTE access points to establish the 5GNR SCCs. The LTE and 5GNR MACs receive scheduling data for the PCC and SCCs from the 5GNR/LTE access points. Thus, the LTE MACs receive scheduling that terminates some of the LTE SCCs which may be contributing unwanted intermodulation interference to the 5GNR SCCs.

Figure 5:
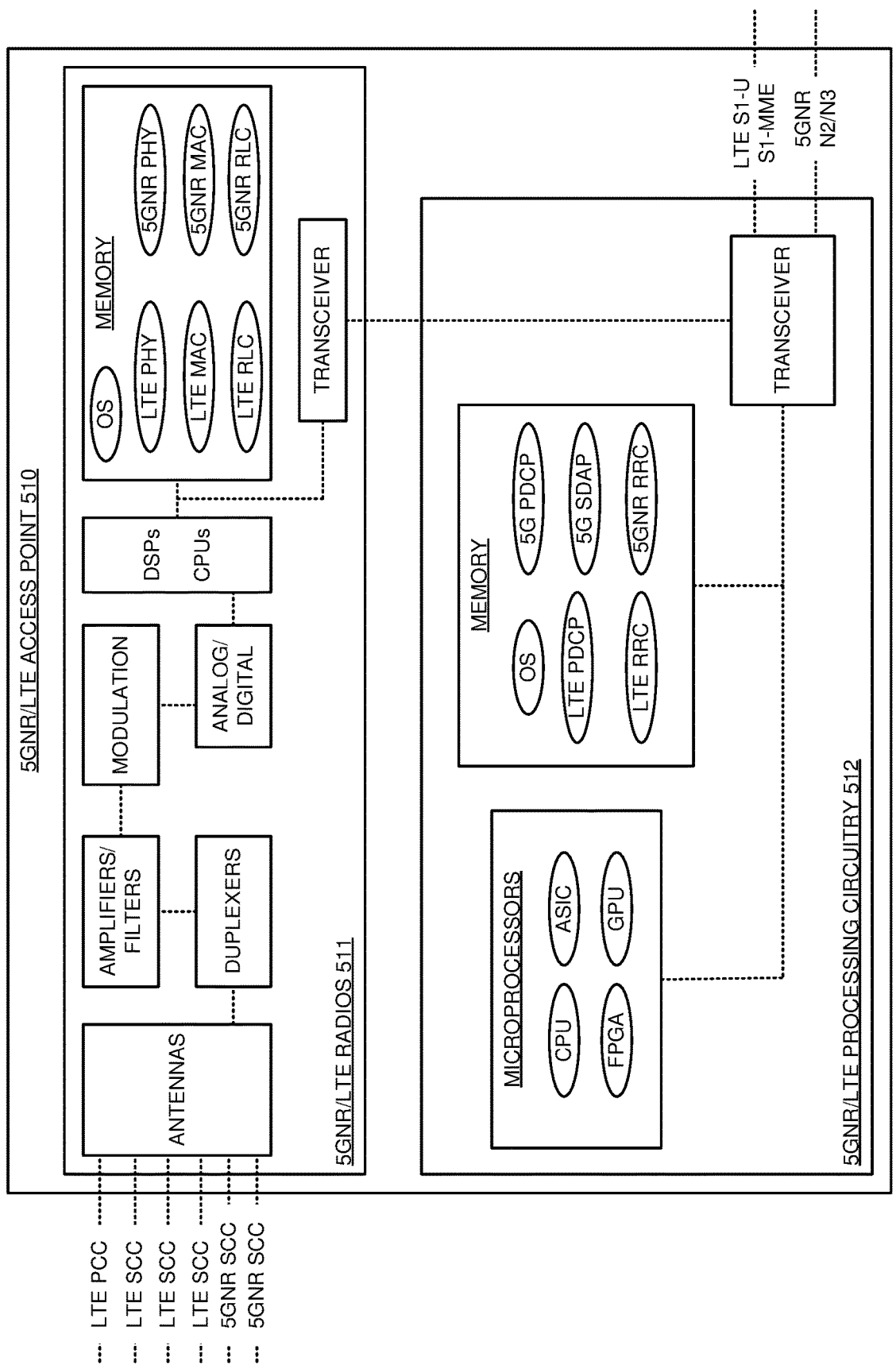
FIG. 5 illustrates an LTE/5GNR access point that wirelessly serves UEs with a wireless communication service using carrier aggregation and intermodulation interference mitigation.

FIG. 5 illustrates 5GNR/LTE access point 510 that wirelessly serves UEs with a wireless communication service using CA and intermodulation interference mitigation. 5GNR/LTE access point 510 comprises an example of wireless access point 110, although access point 110 may differ. 5GNR/LTE access point 510 comprises 5GNR/LTE radios 511 and 5GNR/LTE processing circuitry 512. 5GNR/LTE radios 511 comprise antennas, duplexers, amplifiers, filters, modulation, analog/digital interfaces, DSPs/CPUs, memory, and a transceiver that are coupled over bus circuitry and/or some other data links. 5GNR/LTE processing circuitry 512 comprises microprocessors, memory, and a transceiver that are coupled over bus circuitry and/or some other data links. The microprocessors comprise CPUs, GPUs, ASICs, FPGAs, and/or some other computer circuitry. The memories comprise volatile and non-volatile memories like RAM, flash, and the like. In this example, radios 511 host the network applications for PHY, MAC, and RLC while processing circuitry 512 hosts the network applications for PDCP, RRC, and SDAP. Other protocol split options could be used in other examples.

In 5GNR/LTE radios 511, the antennas receive wireless Uplink (UL) signals from 5GNR/LTE UEs that transport user data and network signaling. The antennas transfer corresponding electrical UL signals through the duplexers to the amplifiers. The amplifiers boost the received UL signals for filters which attenuate unwanted energy. In modulation, demodulators down-convert the UL signals from the primary LTE frequency band. The analog/digital interfaces convert the analog UL signals into digital UL signals for the DSP/CPUs. The DSP/CPUs execute an LTE PHY, MAC, and RLC to recover the user data and network signaling from the UL signals. The DSP/CPUs store the UL user data and network signaling in the memory. The DSP/CPUs transfer the UL user data and network signaling from the memory in radios 511 to the memory in processing circuitry over the transceivers. In 5GNR/LTE processing circuitry 512, the microprocessors execute an LTE PDCP and RRC to process the UL user data and network signaling and responsively generate corresponding UL user data and network signaling for the transceiver to transfer to the network core over respective LTE S1-U and S1-Mobility Management Entity (MME) links.

In 5GNR/LTE processing circuitry 512, the transceiver receives Downlink (DL) user data and network signaling from the network core over the respective LTE S1-U and S1-Mobility Management Entity (MME) links. In some examples, the transceiver receives DL user data from the network core over the respective 5GNR N3 links. The transceivers store the DL user data and network signaling in memory. The microprocessors execute an LTE RRC, LTE PDCP, 5GNR SDAP, 5GNR RRC, and 5GNR PDCP to process the DL user data and network signaling and responsively transfer corresponding DL user data and network signaling over the transceivers to the memory in 5GNR/LTE radios 511. In 5GNR/LTE radios 511, the DSP/CPUs execute an LTE RLC, LTE MAC, LTE PHY, 5GNR RLC, 5GNR MAC, and 5GNR PHY to process the DL user data and network signaling and generate corresponding digital DL signals for the analog/digital interface. The analog/digital interface converts the digital DL signals into analog DL signals for modulation. Modulation up-converts the DL signals to the: LTE primary frequency band for the LTE PCC, LTE secondary frequency bands for the LTE SCCs, and 5GNR secondary frequency bands for the 5GNR SCCs. The amplifiers boost the DL signals for the filters which attenuate unwanted out-of-band energy. The filters transfer the DL signals through the duplexers to the antennas. The electrical DL signals drive the antennas to emit corresponding wireless DL signals that transport the DL user data and network signaling to 5GNR/LTE UEs.

The LTE RRC in processing circuitry 512 exchanges user data and network signaling with the network core over the S1-U and S1-MME links. The LTE RRC maps between the data/signaling and SDUs. The LTE RRC exchanges data SDUs with the 5GNR SDAP and the LTE PDCP. The LTE RRC exchanges signaling SDUs with the 5GNR RRC and the LTE PDCP. The 5GNR PDCP and the LTE PDCP map between the SDUs and PDUs. The 5GNR and LTE PDCPs exchange the PDUs with the 5GNR and LTE RLCs. The 5GNR and LTE RLCs map between the PDUs and MAC logical channels. Over the MAC logical channels, the 5GNR RLC exchanges user data and network signaling with the 5GNR MAC and the LTE RLC exchanges user data and network signaling with the LTE MAC. The 5GNR and LTE MACs map between the MAC logical channels and MAC transport channels. Over the MAC transport channels, the 5GNR MAC exchanges user data and network signaling with the 5GNR PHY, and the LTE MAC exchanges user data and network signaling with the LTE PHY. The 5GNR PHY and the LTE PHY map between the MAC transport channels and PHY transport channels. The 5GNR PHY exchanges user data and network signaling with 5GNR PHYs in 5GNR/LTE UEs over the PHY transport channels. The LTE PHY exchanges user data and network signaling with LTE PHYs in the 5GNR/LTE UEs over the PHY transport channels.

RRC functions comprise authentication, security, handovers, status reporting, QoS, system broadcasts, and network pages. SDAP functions comprise QoS marking and flow control. PDCP functions comprise security ciphering, header compression and decompression, sequence numbering and re-sequencing, de-duplication. RLC functions comprise ARQ, sequence numbering and resequencing, segmentation and resegmentation. MAC functions comprise buffer status, power headroom, channel quality, HARQ, user identification, random access, user scheduling, and QoS. PHY functions comprise packet formation/deformation, windowing/de-windowing, guard-insertion/guard-deletion, parsing/de-parsing, control insertion/removal, interleaving/de-interleaving, FEC encoding/decoding, rate matching/de-matching, scrambling/descrambling, modulation mapping/de-mapping, channel estimation/equalization, FFTs/IFFTs, channel coding/decoding, layer mapping/de-mapping, pre-coding, DFTs/IDFTs, and RE mapping/de-mapping.

In particular, the 5GNR PHY measures intermodulation interference for the 5GNR SCCs. The 5GNR PHY or LTE RRC compare the intermodulation interference to an interference threshold to detect excessive interference. The 5GNR PHY or LTE RRC determine the likely order (N) of the intermodulation interference by dividing the affected 5GNR frequency band (X) by order (N) to identify secondary LTE bands (X/N) that likely contribute intermodulation interference. The LTE RRC terminates the LTE SCCs in the secondary LTE bands (X/N) that are the likely sources of the intermodulation interference.

Subsequently, the LTE RRC receives additional user data and network signaling for the wireless communication service from the network core. The LTE RRC transfers user data and network signaling for the wireless communication service to 5GNR/LTE radios 511 and to the 5GNR RRC. The 5GNR RRC transfers user data and network signaling for the wireless communication service to 5GNR/LTE radios 512. Radios 511-512 transfer network signaling to the UEs to implement CA. 5GNR/LTE radios 512 exchange user data and network signaling with the UEs over LTE PCCs. 5GNR/LTE radios 512 transfer user data to the UEs over the non-X/N LTE SCCs that were not terminated. 5GNR/LTE radios 512 transfer user data to the UEs over one or more 5GNR SCCs.

Figure 6:
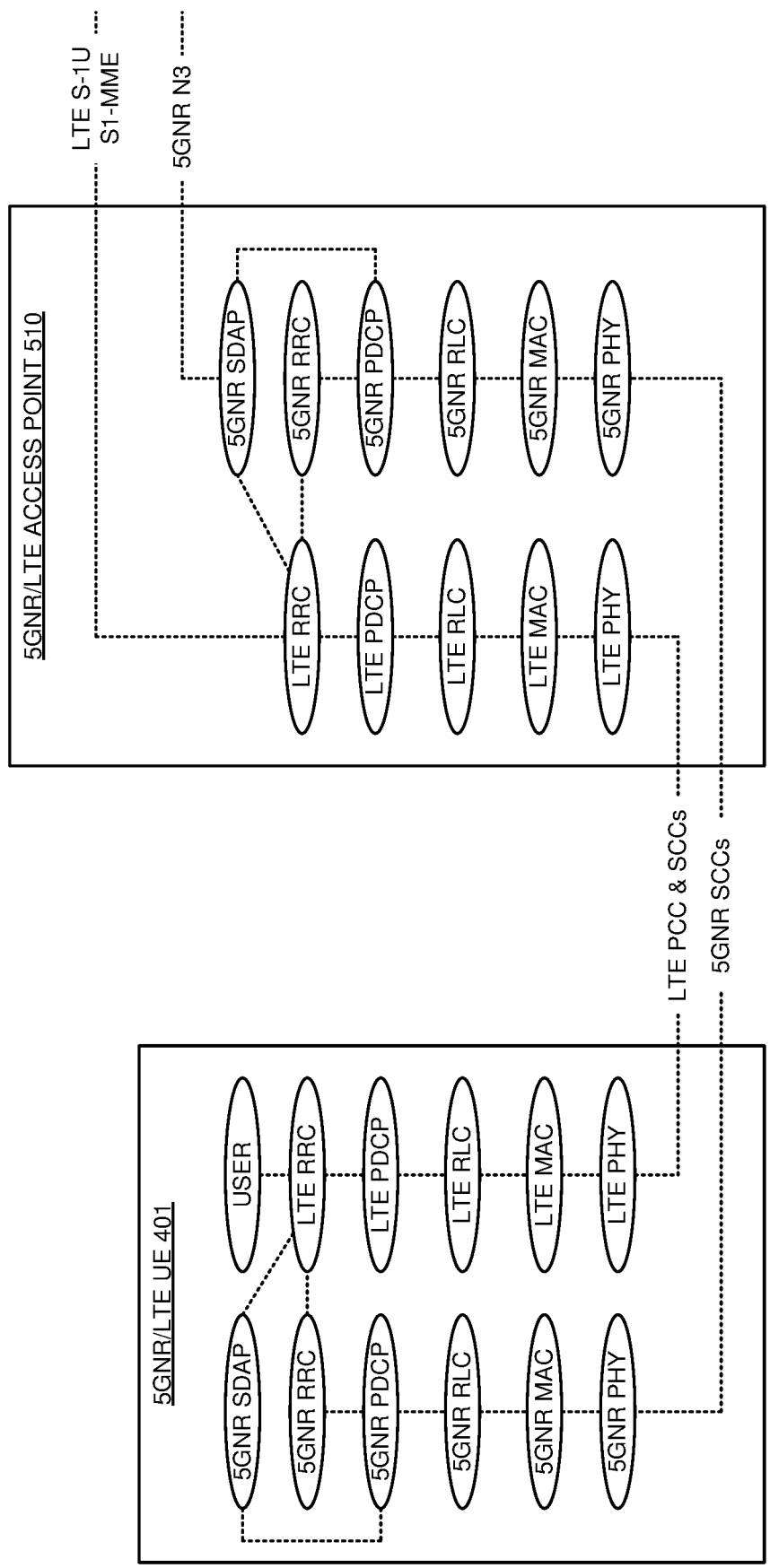
FIG. 6 illustrates the LTE/5GNR access point that wirelessly serves the UEs with the wireless communication service using carrier aggregation and intermodulation interference mitigation.

FIG. 6 further illustrates LTE/5GNR access point 510 that wirelessly serves the UEs with the wireless communication service using CA and intermodulation interference mitigation. For clarity, some circuitry and software from FIGS. 4-5 is omitted from FIG. 6. The LTE RRC in access point 510 exchanges user data and network signaling with the network core over S1-U and S1-MME links. In some examples, the 5GNR SDAP in access point 510 exchanges user data with the network core over N3 links. In access point 510, the LTE RRC and the 5GNR SDAP exchange user data, and the LTE RRC and the 5GNR RRC exchange network signaling. The LTE RRC in access point 510 and the LTE RRC in UE 401 exchange user data and network signaling over the LTE PDCPs, RLCs, MACs, and PHYs. The 5GNR RRC in access point 510 and the 5GNR RRC in UE 401 exchange network signaling over the 5GNR PDCPs, RLCs, MACs, and PHYs. The 5GNR SDAP in access point 510 and the 5GNR SDAP in UE 401 exchange user data over the 5GNR PDCPs, RLCs, MACs, and PHYs.

The LTE MAC in access point 510 and the LTE MAC in UE 401 exchange network signaling over the LTE PHYs to schedule the CA PCCs and SCCs—including terminating some LTE SCCs. The 5GNR MAC in access point 510 and the 5GNR MAC in UE 401 exchange network signaling over the 5GNR PHYs to schedule the CA SCCs. The LTE PHY in access point 510 and the LTE PHY in UE 401 exchange user data and network signaling over LTE PCCs. The LTE PHY in access point 510 transfers user data to the LTE PHY in UE 401 over LTE SCCs. The 5GNR PHY in access point 510 transfers user data to the 5GNR PHY in UE 401 over 5GNR SCCs. In UE 401, the LTE RRC and the 5GNR SDAP exchange user data, and the LTE RRC and the 5GNR RRC exchange network signaling. In UE 401, the LTE RRC and the user application exchange user data and signaling.

In 5GNR/LTE access point 510, the 5GNR PHY detects intermodulation interference on the 5GNR bands by processing Sounding Reference Signals (SRS). The 5GNR PHY compares the intermodulation interference on the 5GNR bands to a threshold. When the intermodulation interference exceeds the threshold, the 5GNR PHY transfers an intermodulation interference notice for the affected 5GNR band to the LTE RRC over the 5GNR MAC, RLC, PDCP, and RRC. The LTE RRC identifies current LTE SCCs that likely contribute second, third and fourth order intermodulation interference to the affected 5GNR frequency band. The LTE RRC exchanges network signaling with 5GNR/LTE UE 401 and with the LTE MME to terminate the identified LTE SCCs. The LTE RRC exchanges network signaling with LTE MACs over the LTE PDCPs and RLCs to terminate the identified LTE SCCs.

The wireless data network circuitry described above comprises computer hardware and software that form special-purpose wireless network circuitry to use enhanced CA with intermodulation interference mitigation. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose wireless network circuitry wireless network circuitry to use enhanced CA with intermodulation interference mitigation.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless access point wirelessly serve User Equipment (UEs) with a wireless communication service using carrier aggregation and intermodulation interference mitigation, the method comprising:
   wirelessly transferring user data for the wireless communication service to the UEs using the carrier aggregation over a primary Long Term Evolution (LTE) band that transports LTE primary component carriers, secondary LTE bands that transport LTE secondary component carriers, and secondary Fifth Generation New Radio (5GNR) bands that transport 5GNR secondary component carriers;
   Physical Layer (PHY) network applications measuring third order intermodulation interference in the secondary 5GNR bands; and
   terminating at least some of the LTE secondary component carriers in the secondary LTE bands when the third order intermodulation interference in the secondary 5GNR bands exceeds a third order interference threshold.

2. The method of claim 1 further comprising:
   measuring second order intermodulation interference in the secondary 5GNR bands and comparing the second order intermodulation interference to a second order interference threshold; and
   terminating additional ones of the LTE secondary component carriers in the secondary LTE bands when the second order intermodulation interference in the secondary 5GNR bands exceeds a second order interference threshold.

3. The method of claim 1 further comprising:
   measuring fourth order intermodulation interference in the secondary 5GNR bands and comparing the fourth order intermodulation interference to a fourth order interference threshold; and
   terminating additional ones of the LTE secondary component carriers in the secondary LTE bands when the fourth order intermodulation interference in the secondary 5GNR bands exceeds a fourth order interference threshold.

4. The method of claim 1 further comprising:
   detecting data transmission errors in the secondary 5GNR bands; and
   wherein terminating the LTE secondary component carriers comprises terminating the LTE secondary component carriers in response to the data transmission errors in the secondary 5GNR bands exceeding the error threshold.

5. The method of claim 1 wherein terminating the LTE secondary component carriers in the secondary LTE bands comprises Radio Resource Control (RRC) network applications terminating the LTE secondary component carriers in the secondary LTE bands.

6. The method of claim 1 wherein the secondary LTE bands are between 5 megahertz and 2 gigahertz.

7. The method of claim 1 wherein the secondary 5GNR bands are between 1 gigahertz and 4 gigahertz.

8. The method of claim 1 wherein the secondary 5GNR bands are between 1.5 gigahertz and 6 gigahertz.

9. The method of claim 1 wherein the secondary 5GNR bands are between 2 gigahertz and 8 gigahertz.

10. A wireless access point to wirelessly serve User Equipment (UEs) with a wireless communication service using carrier aggregation and intermodulation interference mitigation, the wireless access point comprising:
    wireless radios configured to wirelessly transfer user data for the wireless communication service to the UEs using the carrier aggregation over a primary Long Term Evolution (LTE) band that transports LTE primary component carriers, secondary LTE bands that transport LTE secondary component carriers, and secondary Fifth Generation New Radio (5GNR) bands that transport 5GNR secondary component carriers;
    Physical Layer (PHY) network applications configured to measure third order intermodulation interference in the secondary 5GNR bands; and
    processing circuitry configured to terminate at least some of the LTE secondary component carriers in the secondary LTE bands when the third order intermodulation interference in the secondary 5GNR bands exceeds a third order interference threshold.

11. The wireless access point of claim 10 further comprising:
    the wireless radios configured to measure second order intermodulation interference in the secondary 5GNR bands; and
    the processing circuitry configured to terminate additional ones of the LTE secondary component carriers in the secondary LTE bands when the second order intermodulation interference in the secondary 5GNR bands exceeds a second order interference threshold.

12. The wireless access point of claim 10 further comprising:
the wireless radios configured to measure fourth order intermodulation interference in the secondary 5GNR bands; and
the processing circuitry configured to terminate additional ones of the LTE secondary component carriers in the secondary LTE bands when the fourth order intermodulation interference in the secondary 5GNR bands exceeds a fourth order interference threshold.

13. The wireless access point of claim 10 further comprising:
the wireless radios configured to detect data transmission errors in the secondary 5GNR bands; and
in response to the data transmission errors in the secondary 5GNR bands exceeding an error threshold, the processing circuitry configured to terminate the LTE secondary component carriers in the secondary LTE bands when the third order intermodulation interference in the secondary 5GNR bands exceeds the third order interference threshold.

14. The wireless access point of claim 10 wherein the processing circuitry comprises Radio Resource Control (RRC) network applications configured to terminate the LTE secondary component carriers in the secondary LTE bands.

15. The wireless access point of claim 10 wherein the secondary LTE bands are between 5 megahertz and 2 gigahertz.

16. The wireless access point of claim 10 wherein the secondary 5GNR bands are between 1 gigahertz and 4 gigahertz.

17. The wireless access point of claim 10 wherein the secondary 5GNR bands are between 1.5 gigahertz and 6 gigahertz.

18. The wireless access point of claim 10 wherein the secondary 5GNR bands are between 2 gigahertz and 8 gigahertz.

* * * * *